United States Patent
Way et al.

(10) Patent No.: US 7,206,520 B2
(45) Date of Patent: *Apr. 17, 2007

(54) METHOD AND APPARATUS FOR INTERLEAVED OPTICAL SINGLE SIDEBAND MODULATION

(75) Inventors: Winston Way, Irvine, CA (US); Ming Chia Wu, Irvine, CA (US); Ming-Bing Chen, Irvine, CA (US)

(73) Assignee: OpVista Incorporated, Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/358,990

(22) Filed: Feb. 21, 2006

(65) Prior Publication Data

US 2006/0140643 A1 Jun. 29, 2006

Related U.S. Application Data

(63) Continuation of application No. 09/839,693, filed on Apr. 19, 2001, now Pat. No. 7,003,231, which is a continuation-in-part of application No. 09/575,811, filed on May 22, 2000, now Pat. No. 6,525,857.

(60) Provisional application No. 60/187,383, filed on Mar. 7, 2000.

(51) Int. Cl.
  *H04B 10/04* (2006.01)
(52) U.S. Cl. .................................... 398/186; 398/183
(58) Field of Classification Search .................. 398/76, 398/83, 84, 85, 182, 183, 186, 188
  See application file for complete search history.

(56) References Cited

U.S. PATENT DOCUMENTS

| | | | | |
|---|---|---|---|---|
| 5,301,058 A | * | 4/1994 | Olshansky | 398/194 |
| 5,745,273 A | * | 4/1998 | Jopson | 398/192 |
| 5,880,870 A | * | 3/1999 | Sieben et al. | 398/183 |
| 7,003,231 B2 | * | 2/2006 | Way et al. | 398/186 |

* cited by examiner

*Primary Examiner*—Christina Leung
(74) *Attorney, Agent, or Firm*—Fish & Richardson P.C.

(57) ABSTRACT

An optical carrier notch filter includes an optical coupler with at least first, second and third ports. The first port is configured to receive an output that includes an optical carrier and interleaved optical single sideband signals. An optical bandpass filter is coupled to a port of the optical coupler. The optical bandpass filter separates the output into a transmitted signal that contains the optical carrier, and a reflected signal that includes the interleaved optical single sideband signals. The reflected signal is reflected from the optical bandpass filter to the third port of the optical coupler.

13 Claims, 15 Drawing Sheets

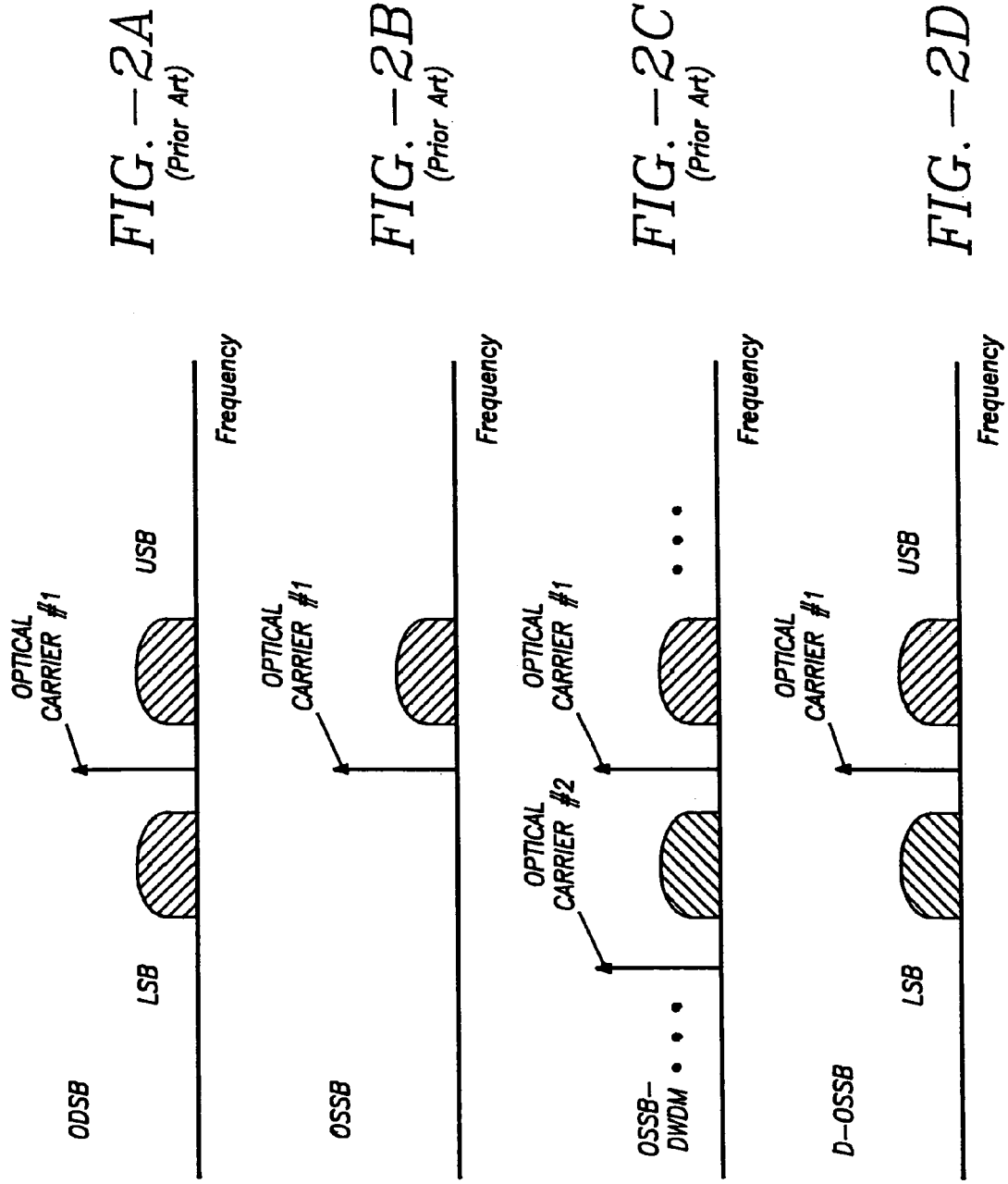

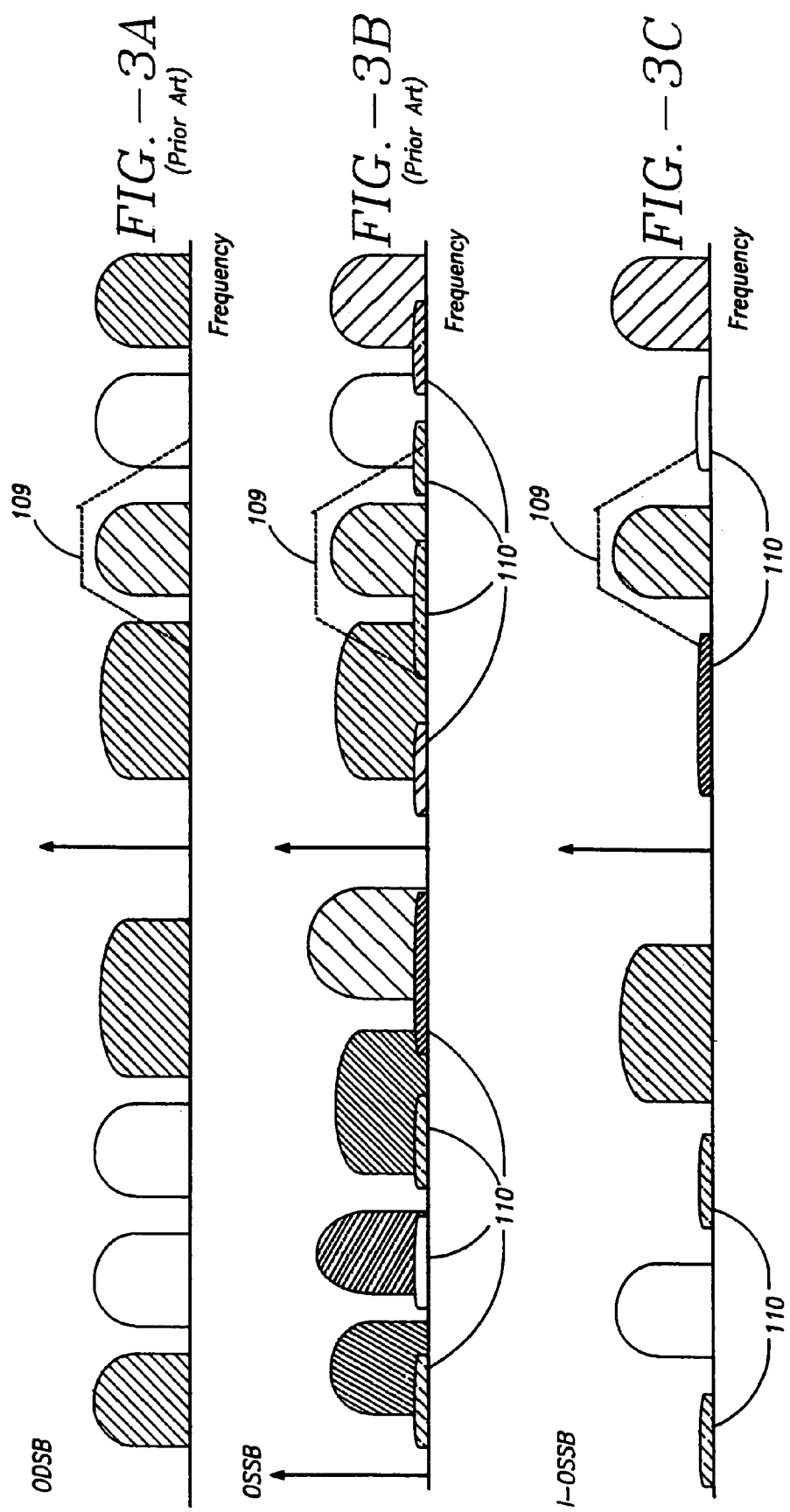

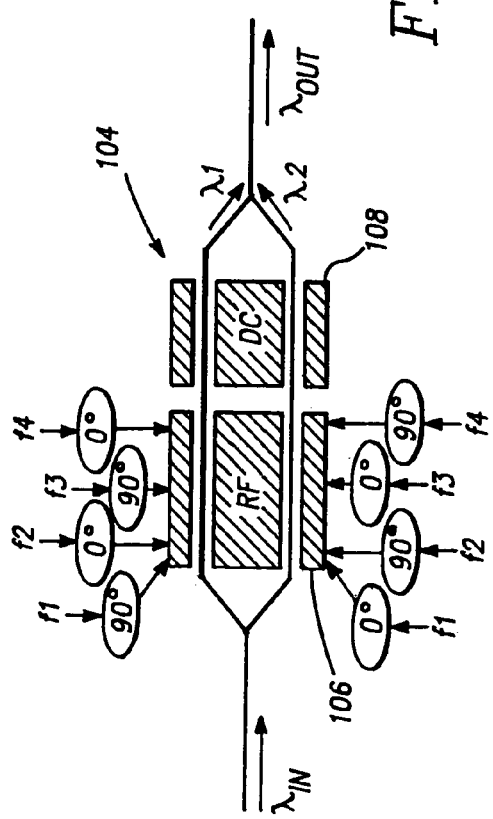
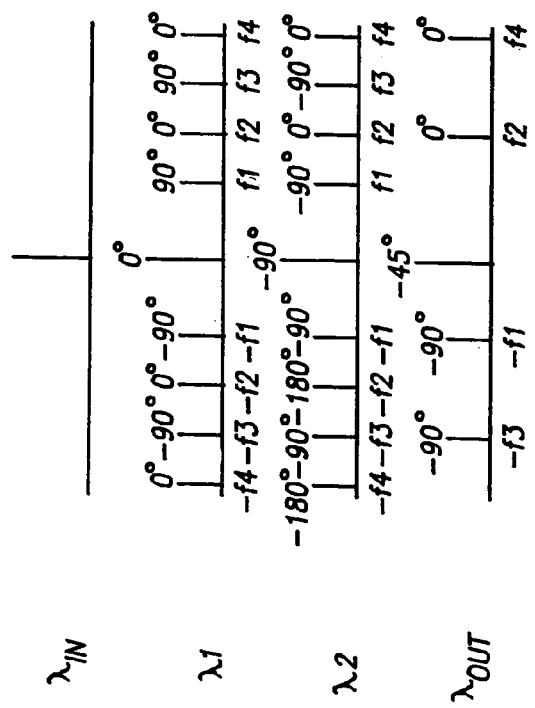
FIG.-6A
FIG.-6B
FIG.-6C
FIG.-6D
FIG.-6E

METHOD AND APPARATUS FOR INTERLEAVED OPTICAL SINGLE SIDEBAND MODULATION

CROSS-REFERENCE To RELATED APPLICATIONS

This application is a Continuation of application Ser. No. 09/839,693 filed Apr. 19, 2001 now U.S. Pat. No. 7,003,231, which claims the benefit of Continuation-In-Part application Ser. No. 09/575,811 filed May 22, 2000 now U.S. Pat. No. 6,525,857. The application Ser. No. 09/575,811 claims the benefit of Provisional Application Ser. No. 60/187,383 filed Mar. 7, 2000.

The disclosures of the above referenced applications, and disclosure of U.S. Publication No. US-2002-0030877-A1 for the application Ser. No. 09/839,693 are incorporated by reference as part of the disclosure of this application.

BACKGROUND OF THE INVENTION

1. Field of the Invention

The present invention relates generally to a method and apparatus for modulation of broadband optical signals, and more particularly to a method and apparatus for combining interleaved optical single sidebands with a modulated optical carrier.

2. Description of Related Art and General Background

Conventional optical fiber transmission systems, such as optical fiber community access television ("CATV") transmission systems can carry multiple channels on a single optical fiber communication line. The channels are transmitted modulated on a wideband signal made up of a plurality of frequency division multiplexed carriers. A wideband optical detector or photo-receiver receives the wideband signal. Each individual channel can be recovered by a heterodyne tuner along with an appropriate microwave filter. An optical fiber transmission system using this type of modulation technique can transmit analog or digital signals and is known as a sub-carrier multiplexed ("SCM") optical transmission system. FIG. 1 shows a schematic diagram of a typical SCM system which is described in detail in W. I. Way, Subcarrier Multiplexed Lightwave Systems for Subscriber Loop Applications, Journal of Lightwave Technology, 1988, pp. 1806–1818.

High spectral efficiency digital modems may be used to greatly increase the spectral efficiency of conventional SCM techniques. For example, an optical transmitter with a 1 GHz bandwidth can transmit 166 sub-carrier 6 MHz 64-QAM (quadrature amplitude modulation) channels. Since each channel can carry 30 Mb/s of data, 4.98 Gb/s of data may be transmitted, which gives a spectral efficiency of approximately 5 bits/sec/Hz. In comparison, the same transmitter can transmit only 1.4 Gb/s of on-off keying data for a spectral efficiency of only about 1.4 bits/sec/Hz.

There are two important problems to overcome when using a broadband optical transmitter to transport a large quantity of digital data using SCM technology. The first is that the receiver must be a very wideband photoreceiver, which tend to have high spectral noise density and require a complicated and expensive heterodyne receiver. The second is that SCM is an optical double-sideband modulation (ODSB) technique, as shown in FIG. 2A. This means that half of the bandwidth is wasted, as each of the upper and lower sidebands are carrying the same information. One solution to this problem, as shown in Olshansky (U.S. Pat. No. 5,301,058), is to eliminate the lower side band to produce an optical single-sideband signal (OSSB) as shown in FIG. 2B. One may then combine many OSSB modulators, using multiple carrier signals, to more efficiently use the available optical fiber transmission spectrum. This is illustrated in FIG. 2C. This is known as OSSB-DWDM, or optical single side band, dense wavelength division multiplexing. Using double OSSB (D-OSSB), the upper and lower sidebands carry different signals, as shown in FIG. 2D. Thus, the required number of carriers is only half of that required by the OSSB modulation shown in FIG. 2C.

When amplifying the transmitted signal in a conventional multiplexing method, the carrier signal is likewise amplified. Amplification of the carrier signal represents a waste of amplifier gain, since gain is used to amplify a signal that carries no information. Moreover, as power density in the transmission fiber is increased, signal distortions due to optical nonlinear effects are also increased. Elimination of the carrier signal can significantly decrease the total signal power, thereby reducing the total power density and nonlinear effects.

One method for suppressing the carrier is disclosed by Olshansky (U.S. Pat. No. 5,301,058) and Price (U.S. Pat. No. 6,118,566). However, the method requires a pair of Mach Zehnder interferometers and a pair of microwave modulators to generate just two sidebands. The apparatus is complicated and costly.

Yet another method for suppressing the carrier signal is disclosed by Jopson (U.S. Pat. No. 5,745,273). Jopson makes use of a dual path modulator arranged in an optical loop. The light is divided by a coupler which provides a portion of the signal to an optical fiber traveling in each direction around the loop. The signal in one direction is modulated to create a carrier and sidebands while the other is solely the carrier. Upon recombining the two optical signals in a combiner, a signal is produced in which the two carrier signals cancel each other and leave only the modulated signal. One drawback of the Jopson arrangement is the requirement of extremely strict tolerances with respect to the lengths of the paths of the loop so that the two signals will arrive at the combiner having the carrier signals exactly out of phase. This requirement makes the Jopson device difficult to implement in practice.

Another important fact is that the suppressed optical carrier implies a waste of optical power. Therefore, it is preferred to re-use the optical carrier by modulating it with a new baseband data channel.

Even these solutions are imperfect. Use of an OSSB suppressed carrier (OSSB-SC) modulation method, when applied to multi-channel, long-distance optical fiber transmission systems, presents three additional problems. First, conventional narrowband optical filters have a slow roll-off which makes it likely that an optical filter used in the receiver will allow portions of adjacent channels to enter into the filtered window, producing noise in the signal, as illustrated in FIGS. 3A and 3B. Second, as illustrated in FIG. 3B, residual images are produced due to imperfections in the 90° phase shift of the high frequency electrical modulating signal or in the phase shift of the optical signal between the arms of the Mach-Zehnder modulator. Third, dispersion causes self- and external phase modulations which tend to produce distortions in signals transmitted over long distances at 1550 nm, due to beating among the several optical channels, e.g., four-wave mixing products. This last problem may be reduced by the use of conventional dispersion reduction techniques such as use of a chirped fiber grating or dispersion compensating fibers. However, both of these conventional techniques are costly and cannot manage the entire wavelength range.

To avoid residual images and optical nonlinearity-induced distortions, there is a need to use interleaved optical single sidebands, or optical single sidebands having unequal spacing between neighboring channels. To suppress the optical carrier and yet still re-use it, there is a need for an optical carrier notch filter that combines interleaved optical single sidebands with a modulated optical carrier.

SUMMARY OF THE INVENTION

Accordingly, an object of the present invention is to provide an optical single sideband modulator which produces an optical carrier and interleaved single sidebands or single sidebands with unequal channel spacing.

Another object of the present invention is to provide an improved optical carrier notch filter whose reflected part contains the interleaved single sidebands with a suppressed optical carrier, and whose transmission part contains the optical carrier.

A further object of the present invention is to provide a method and apparatus that remotely notches out or re-inserts an optical carrier.

Yet another object of the present invention is to provide a method of modulating an optical carrier with a baseband signal with a baseband modulator.

Another object of the present invention is to provide optical combiner that combines interleaved optical single sidebands with a modulated optical carrier.

A further object of the present invention is to provide a method of separating interleaved sideband signals from an optical carrier and modulating the optical carrier to create a modulated optical carrier.

These and other objects of the present invention are achieved in an optical carrier notch filter. An optical coupler is provided that includes at least first, second and third ports. The first port is configured to receive an output that includes an optical carrier and interleaved optical single sideband signals. An optical bandpass filter is coupled to a port of the optical coupler. The optical bandpass filter separates the output into a transmitted signal that contains the optical carrier, and a reflected signal that includes the interleaved optical single sideband signals. The reflected signal is reflected from the optical bandpass filter to the third port of the optical coupler.

In another embodiment of the present invention, an optical carrier notch filter includes an optical coupler with at least first, second and third ports. The first port is configured to receive an output that includes an optical carrier and interleaved optical single sideband signals. An optical narrowband-reject filter is coupled to a port of the optical coupler. The optical narrowband-reject filter separates the output into a reflected signal that contains the optical carrier and a transmitted signal that includes the interleaved optical single sideband signals that are transmitted through the optical narrowband-reject filter.

In another embodiment of the present invention, an optical carrier notch filter includes a multiple port circulator with at least first, second and third ports. An optical narrowband-reject filter is coupled to the second port of the multiple port circulator. The optical narrowband-reject filter separates an output received from the circulator into a transmitted signal that contains an optical carrier and a reflected signal that includes interleaved optical single sideband signals. The reflected signal is reflected from the optical narrowband-reject filter to the third port of the circulator.

In another embodiment of the present invention, an optical carrier notch filter includes a multiple port circulator with at least first, second and third ports. An optical narrowband-reject filter is coupled to the second port of the multiple port circulator. The optical narrowband-reject filter separates an output received from the circulator into a reflected signal that contains an optical carrier and a transmitted signal that includes interleaved optical single sideband signals. The transmitted signal is transmitted through the optical narrowband-reject filter.

In another embodiment of the present invention, an interleaved optical single sideband communications system includes a Mach-Zehnder modulator constructed and arranged to accept an incoming optical carrier. The Mach-Zehnder includes a splitter which splits the incoming optical signal into a first optical carrier and a second optical carrier. A first AC phase modulator applies a first electrical signal carrying a plurality of first channels and modulates the first optical signal. A second AC phase modulator applies a second electrical signal carrying a plurality of second channels and modulates the second optical signal. Each first channel corresponds to one of the second channels. Each first channel is phase shifted 90° relative to each corresponding second channel. A first DC phase modulator modulates the first optical signal. A second DC phase modulator modulates the second optical signal. The first and second DC phase modulators are constructed and arranged to modulate an optical carrier component of the first optical signal to be phase shifted 90° relative to an optical carrier component of the second optical signal. The optical carrier component of the second optical signal has a frequency substantially equal to the optical carrier component of the first optical signal. A directional coupler is coupled to the Mach-Zehnder modulator and combines the modulated first and second optical signals to form a combined optical signal having an optical carrier component. Alternate channels of the combined optical signal are substantially cancelled. The Mach-Zehnder modulator creates a first single side band on a side of the optical carrier frequency, a first residual image on the opposite side of the optical carrier frequency, a second side band on a side of the optical carrier frequency, and a second residual image on the opposite side of the optical carrier frequency.

In another embodiment of the present invention, an interleaved optical single sideband communications system includes a Mach-Zehnder modulator constructed and arranged to accept an incoming optical carrier. The Mach-Zehnder modulator includes a splitter that splits the incoming optical signal into a first optical carrier and a second optical carrier. A first AC phase modulator applies a first electrical signal carrying a plurality of first channels and modulates the first optical signal. A second AC phase modulator applies a second electrical signal carrying a plurality of second channels and modulates the second optical signal. Each first channel corresponds to one of the second channels. Each first channel is phase shifted 90° relative to each corresponding second channel. A first DC phase modulator modulates the first optical signal. A second DC phase modulator modulates the second optical signal. The first and second DC phase modulators are constructed and arranged to modulate an optical carrier component of the first optical signal to be phase shifted 90° relative to an optical carrier component of the second optical signal. The optical carrier component of the second optical signal has a frequency substantially equal to the optical carrier component of the first optical signal. A combiner combines the modulated first and second optical signals to form a combined optical signal having an optical carrier component. Alternate channels of the combined optical signal are substantially cancelled. A notch filter is coupled to the Mach-Zehnder modulator. The notch filter includes an optical coupler with at least first, second and third ports. The first port is configured to receive an output that includes an optical carrier and interleaved optical single sideband signals. An optical bandpass filter is coupled to a second port of the optical coupler. The optical bandpass filter separates the output into a transmitted signal that contains the optical carrier and a reflected signal that includes the interleaved optical single sideband signals. The reflected signal is reflected from the optical bandpass filter to the third port of the optical coupler.

In another embodiment of the present invention, An interleaved optical single sideband communications system includes a Mach-Zehnder modulator that is constructed and arranged to accept an incoming optical carrier. The Mach-Zehnder modulator includes a splitter which splits the incoming optical signal into a first optical carrier and a second optical carrier. A first AC phase modulator applies a first electrical signal carrying a plurality of first channels and modulates the first optical signal. A second AC phase modulator applies a second electrical signal carrying a plurality of second channels and modulates the second optical signal. Each first channel corresponds to one of the second channels. Each first channel is phase shifted 90° relative to each corresponding second channel. A first DC phase modulator modulates the first optical signal. A second DC phase modulator modulates the second optical signal. The first and second DC phase modulators are constructed and arranged to modulate an optical carrier component of the first optical signal to be phase shifted 90° relative to an optical carrier component of the second optical signal. The optical carrier component of the second optical signal has a frequency substantially equal to the optical carrier component of the first optical signal. A combiner combines the modulated first and second optical signals and forms a combined optical signal with an optical carrier component. Alternate channels of the combined optical signal are substantially cancelled. A notch filter coupled to the Mach-Zehnder modulator. The notch filter includes an optical coupler with at least first, second and third ports. The first port being configured to receive an output that includes an optical carrier and interleaved optical single sideband signals, and an optical narrowband-reject filter coupled to a second port of the optical coupler. The optical narrowband-reject filter separates the output into a reflected signal that contains the optical carrier and a transmitted signal that includes the interleaved optical single sideband signals. The transmitted signal is transmitted through the optical narrowband-reject filter.

In another embodiment of the present invention, an interleaved optical single sideband communications system. A single Mach-Zehnder modulator is constructed and arranged to accept an incoming optical carrier. The Mach-Zehnder modulator includes a splitter which splits the incoming optical signal into a first optical carrier and a second optical carrier. A first AC phase modulator applies a first electrical signal carrying a plurality of first channels to modulate the first optical signal. A second AC phase modulator applies a second electrical signal carrying a plurality of second channels to modulate the second optical signal. Each first channel corresponds to one of the second channels. Each first channel is phase shifted 90° relative to each corresponding second channel. A first DC phase modulator to modulate the first optical signal. A second DC phase modulator modulates the second optical signal. The first and second DC phase modulators are constructed and arranged to modulate an optical carrier component of the first optical signal to be phase shifted 90° relative to an optical carrier component of the second optical signal. The optical carrier component of the second optical signal has a frequency substantially equal to the optical carrier component of the first optical signal. A combiner combines the modulated first and second optical signals to form a combined optical signal having an optical carrier component. Alternate channels of the combined optical signal are substantially cancelled. The Mach-Zehnder modulator creates a first single side band on a side of the optical carrier frequency with a first residual image on a side of the optical carrier frequency, and a second side band on a side of the optical carrier frequency with a second residual image on a side of the optical carrier frequency. A frequency of the first side band is offset from the second residual image, and a frequency of the second side band is offset from the first residual image.

In another embodiment of the present invention, a method of modulating an optical carrier includes receiving an output that has an optical carrier and interleaved sideband signals. The interleaved sideband signals are separated from the optical carrier. The optical carrier is modulated to create a modulated optical carrier.

In another embodiment of the present invention, a method of re-inserting an optical carrier at a remote location in a network includes receiving an output that has an interleaved sideband signals with a suppressed optical carrier. An optical carrier is combined with the same wavelength as the suppressed optical carrier and the interleaved sideband signals at a remote network site.

In another embodiment of the present invention, a method of re-modulating or suppressing an optical carrier at a remote location in a network includes receiving an output that has an optical carrier and interleaved sideband signals. The interleaved sideband signals are separated from the optical carrier at a remote network site. The optical carrier is modulated to create a modulated optical carrier or notched out.

In another embodiment of the present invention, a method of modulating an optical carrier frequency in a Mach Zehnder interferometer modulator that has a first phase modulator and a second phase modulator includes splitting a power of the optical carrier frequency into a first portion and a second portion. The first portion of the carrier signal frequency is introduced to the first phase modulator and the second portion of the carrier signal frequency is introduced to the second phase modulator. A first signal is applied to the first phase modulator at a first phase and to the second phase modulator at a second phase. A first single side band is created on a side of the optical carrier frequency. A first residual image is created on a side of the optical carrier frequency. A second signal is applied to the first phase modulator at a first phase and to the second phase modulator at a second phase. A second side band is created on a side of the optical carrier frequency. A second residual image is created on a side of the optical carrier frequency. A frequency of the first side band is offset from the second residual image, and a frequency of the second side band is offset from the first residual image.

In another embodiment of the present invention, a method of transmitting a plurality of channels provides a plurality of electrical signals. Each electrical signal corresponds to a channel. First and second split signals are produced that correspond to each of the plurality of signals. Each first split signal is substantially at quadrature with a corresponding second split signal. An optical carrier signal is provided. The optical carrier signal is multiplexed with the split signals to produce a multiplexed optical signal. Alternate channels are substantially cancelled and residual images of upper side band channels do not substantially overlap channels carried on a lower side band.

BRIEF DESCRIPTION OF THE DRAWINGS

FIGS. 2A through 2D are spectral diagrams comparing spectral efficiency of various modulation techniques.

FIG. 3A is a spectral diagram showing optical double sideband transmission.

FIG. 3B is a spectral diagram showing optical single sideband transmission.

FIG. 3C is a spectral diagram showing interleaved optical single sideband transmission according to the present invention.

FIG. 6A shows a four channel dual-electrode Mach-Zehnder modulator as employed in the present invention.

FIGS. 6B–6E show spectral diagrams of input and output signals from the modulator shown in FIG. 6A.

DETAILED DESCRIPTION OF THE PREFERRED EMBODIMENTS

Figure 1:
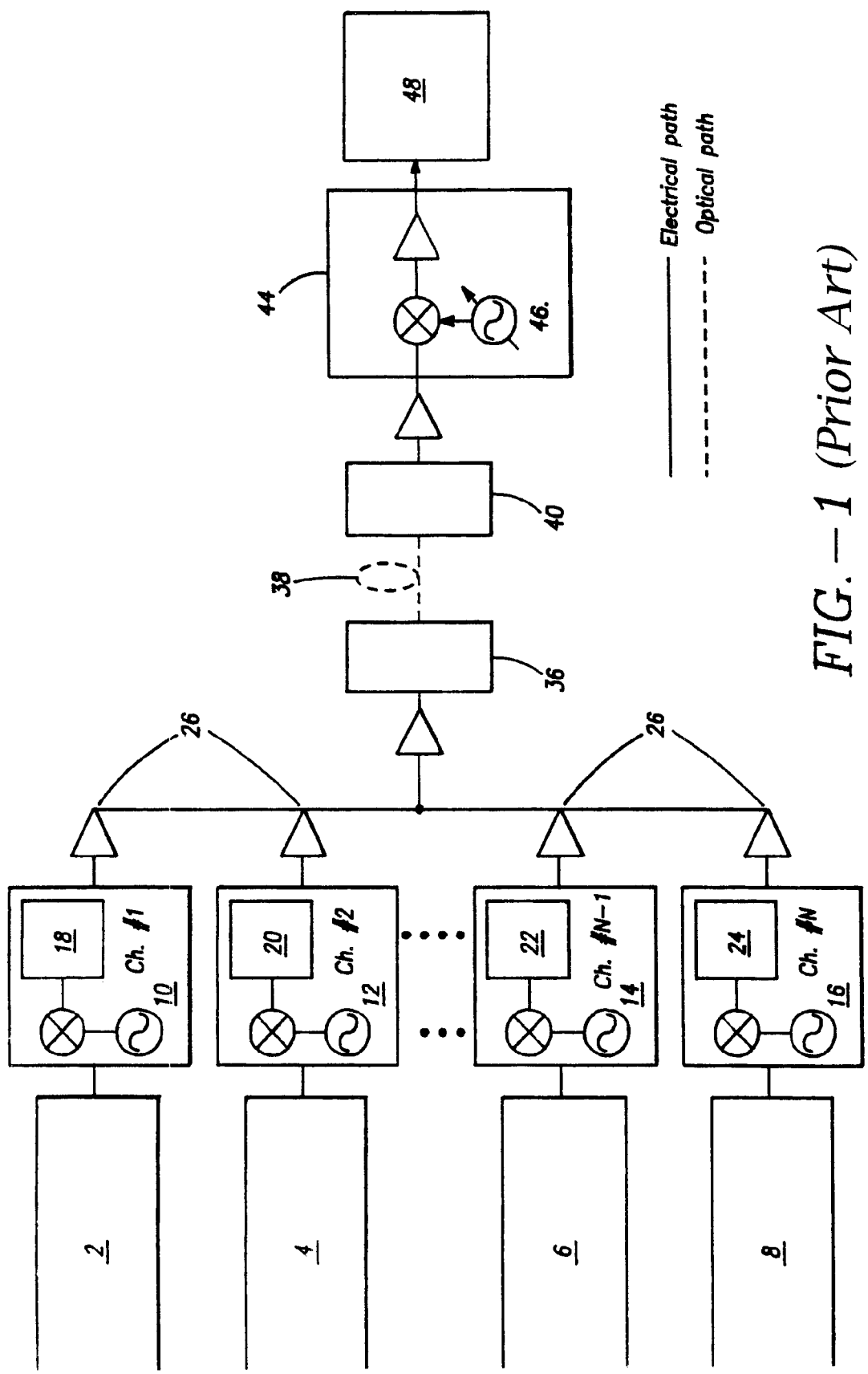
FIG. 1 is a schematic diagram of a conventional subcarrier multiplexed lightwave system.

In the following description, for purposes of explanation and not limitation, specific details are set forth such as particular optical and electrical circuits, circuit components, techniques, etc. in order to provide a thorough understanding of the present invention. However, the invention may be practiced in other embodiments that depart from these specific details. In some instances, detailed descriptions of well-known devices and circuits may be omitted so as not to obscure the description of the present invention with unnecessary details.

In one embodiment of the present invention, an interleaved optical single sideband communications system includes a single Mach-Zehnder modulator, constructed and arranged to accept an incoming optical carrier. A splitter splits the incoming optical signal into a first optical carrier and a second optical carrier. A first AC phase modulator applies a first electrical signal carrying a plurality of first channels to modulate the first optical signal. A second AC phase modulator applies a second electrical signal carrying a plurality of second channels to modulate the second optical signal. Each first channel corresponding to one of the second channels and is phase shifted 90° relative to each corresponding second channel. A first DC phase modulator modulates the first optical signal. A second DC phase modulator modulates the second optical signal. The first and second DC phase modulators are constructed and arranged to modulate an optical carrier component of the first optical signal to be phase shifted 90° relative to an optical carrier component of the second optical signal. The optical carrier component of the second optical signal has a frequency equal to the optical carrier component of the first optical signal. A combiner combines the modulated first and second optical signals to form a combined optical signal having an optical carrier component such that alternate channels of the combined optical signal are substantially cancelled. The single Mach-Zehnder modulator creates an optical carrier, a first single side band on a side of the optical carrier frequency with harmonic signals on the same side of the optical carrier frequency, and with a first residual image on the other side of the optical carrier frequency, a second side band on a side of the optical carrier frequency with harmonic signals on the same side of the optical carrier frequency, and with a second residual image on the other side of the optical carrier frequency. A frequency of the first side band is offset from the harmonics and residual image of the second sideband, and a frequency of the second side band is offset from the harmonics and the residual image of the first sideband.

In another embodiment of the present invention, a method of modulating an optical carrier frequency in a Mach Zehnder interferometer modulator splits a power of the optical carrier frequency into a first portion and a second portion. The first portion of the carrier signal frequency is introduced into a first phase modulator and the second portion of the carrier signal frequency is introduced into a second phase modulator. A first signal is applied to the first phase modulator at a first phase and to the second phase modulator at a second phase. A first single side band and its harmonics are created on a side of the optical carrier frequency. A first residual image is created on the other side of the optical carrier frequency. A second signal is applied to the first phase modulator at a first phase and to the second phase modulator at a second phase. A second side band and its harmonics are created on a side of the optical carrier frequency. A second residual image is created on the other side of the optical carrier frequency. A frequency of the first side band is offset from the residual image and harmonics of the second sideband, and a frequency of the second side band is offset from the residual image and harmonics of the first sideband. Frequencies of the first sideband and the second sideband are also offset from any four-wave mixing products of the two sidebands.

Referring now to FIG. 1, a conventional subcarrier multiplexing transmitter and receiver pair are shown. A plurality of modulators 2, 4, 6, 8, which may be analog, digital or any combination thereof, produce signals corresponding to a plurality of channels. Each channel is frequency division multiplexed by using local oscillators 10, 12, 14, 16 of different radio frequencies, known as subcarriers. The signal for each channel is processed by a band pass filter (not shown) to attenuate components of the signal which are outside of the channel (e.g. harmonics). The several channels are amplified by an amplifier 26 and combined, and the combined signal is amplified once more and used to drive a light emitting device which is conventionally a directly or externally modulated laser diode acting as part of an optical transmitter 36. Preferably the light emitting device has a fast response time and can produce a narrow linewidth with good coherence.

The combined signal is transmitted through an optical fiber 38 to a broadband optical receiver 40. The optical fiber 38 is preferably single mode fiber to reduce modal dispersion and other modal noise problems. It may alternately be a conventional single mode fiber having zero dispersion at 1310 nm or any other single mode fiber. For wavelength division multiplexing applications, or other broadband applications, the dispersion slope is also preferably small. The signal proceeds to a heterodyne tuner which typically includes a tunable local oscillator 46 which is used to selectively tune to one of the channels which may then be demodulated with an appropriate analog or digital demodulator. Preferably, a band pass filter (not shown) may be included in the receiver to better select the desired channel and exclude noise from neighboring channels. The final detection process can be either coherent or incoherent demodulation.

Figure 4A:
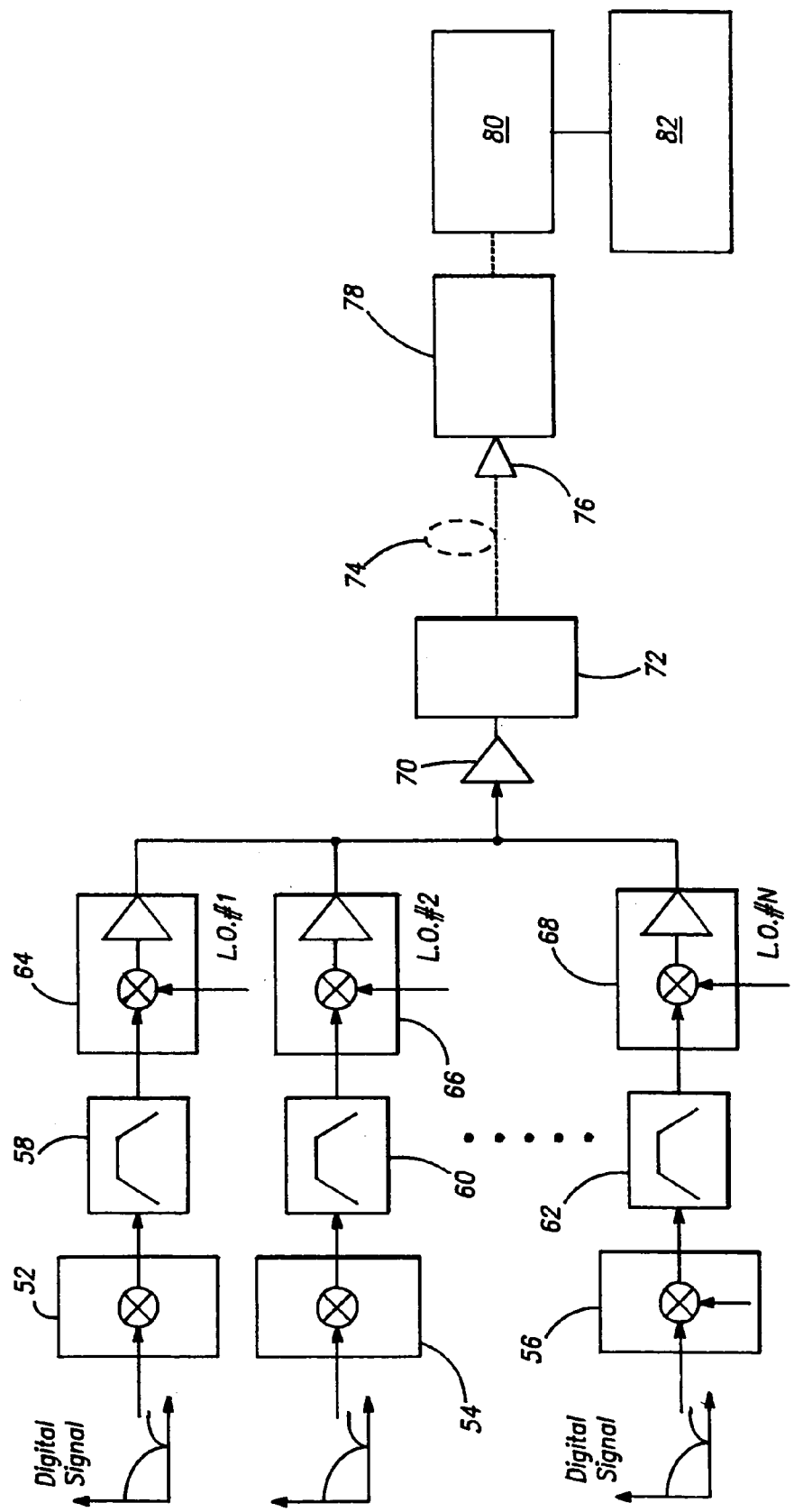
FIG. 4A is a schematic diagram of an optical frequency division multiplexed lightwave system according to the present invention.

FIG. 4A shows a multiple channel transmission system consistent with an aspect of the present invention. Baseband signals are modulated by a plurality of modulators 52, 54, 56. The modulators may be, for example, a simple modulator such as an amplitude shifted keying (ASK) modulator, a frequency shifted keying (FSK) modulator, a differential phase shift keying (DPSK) modulator, a differential quadrature phase shift keying (DQPSK) modulator, or a duobinary modulator.

The modulated signals are each passed through an intermediate frequency band pass filter 58, 60, 62, then modulated using a plurality of upconverters including local oscillators 64, 66, 68. The channels are combined, amplified and passed through an amplifier 70 to an optical transmitter 72 which may be optical transmitter 36 described above with respect to FIG. 1. Optionally, the transmitter 72 may include an erbium-doped fiber amplifier (EDFA, not shown) to increase the signal strength. The combined optical signal passes through a length of optical fiber 74, which is preferably single mode optical fiber. It is optionally pre-amplified with an optical amplifier 76, which is preferably an EDFA. A tunable or fixed channel optical filter 78 selects a particular channel which is then received by a baseband optical receiver 80. The optical filter 78 also helps to reduce spontaneous emission noise produced by the EDFA pre-amplification process. The baseband optical receiver 80 produces an electrical signal which is demodulated by a demodulator 82.

Figure 4B:
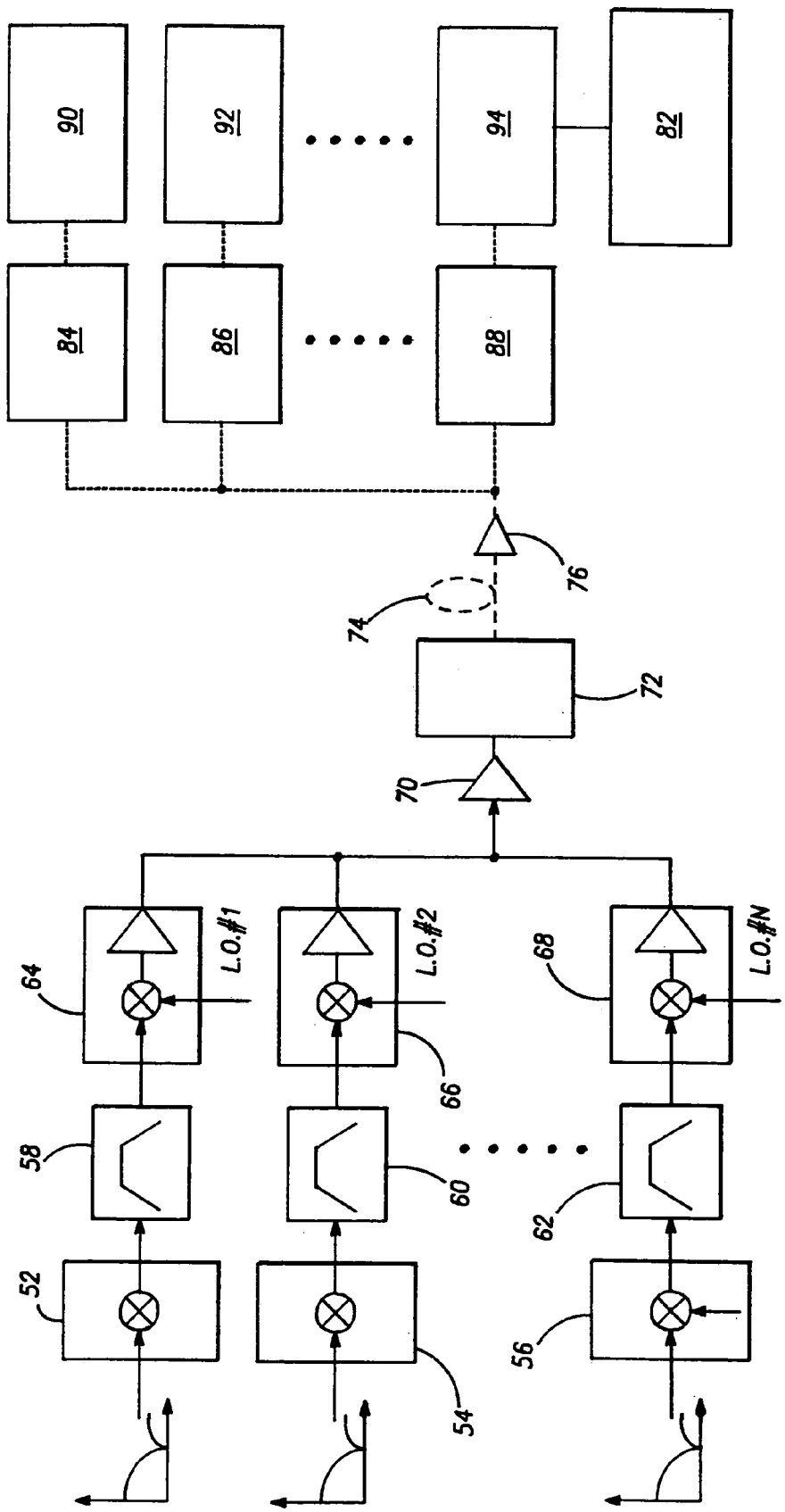
FIG. 4B is a schematic diagram of an optical frequency division multiplexed lightwave system having an array of optical filters according to the present invention.

A second embodiment of a transmission system is shown in FIG. 4B. The system shown in FIG. 4B is similar to the system of FIG. 4A. However, the single tunable optical filter 78 is replaced by a plurality of optical filters 84, 86, 88 each of which is preferably a fixed filter, although each may also be tunable filters adapted to pass only a single selected channel. Each channel signal proceeds to a baseband optical receiver 90, 92, 94 which in turn, passes the resulting electrical signal to a demodulator 82.

Where tunable filters are used, they preferably include a feedback circuit to ensure that the filter passband always locks on to the center of the desired channel, despite any wavelength drift of the laser diode. This provides an advantage over conventional DWDM systems in which all optical transmitters require a stringent wavelength locker. It is also possible that the filter passband is offset from the center of the digital modulated signal passband to eliminate some of its sideband so that the dispersion penalty can be decreased. Note that the tunable optical filter cannot differentiate one channel from the other simply based on locking onto optical power, since all channels have essentially the same optical power. To ensure that the tunable filter can selectively tune to a specific channel, a channel-specific identification information should be built in both the transmitter and the receiver.

Figure 4C:
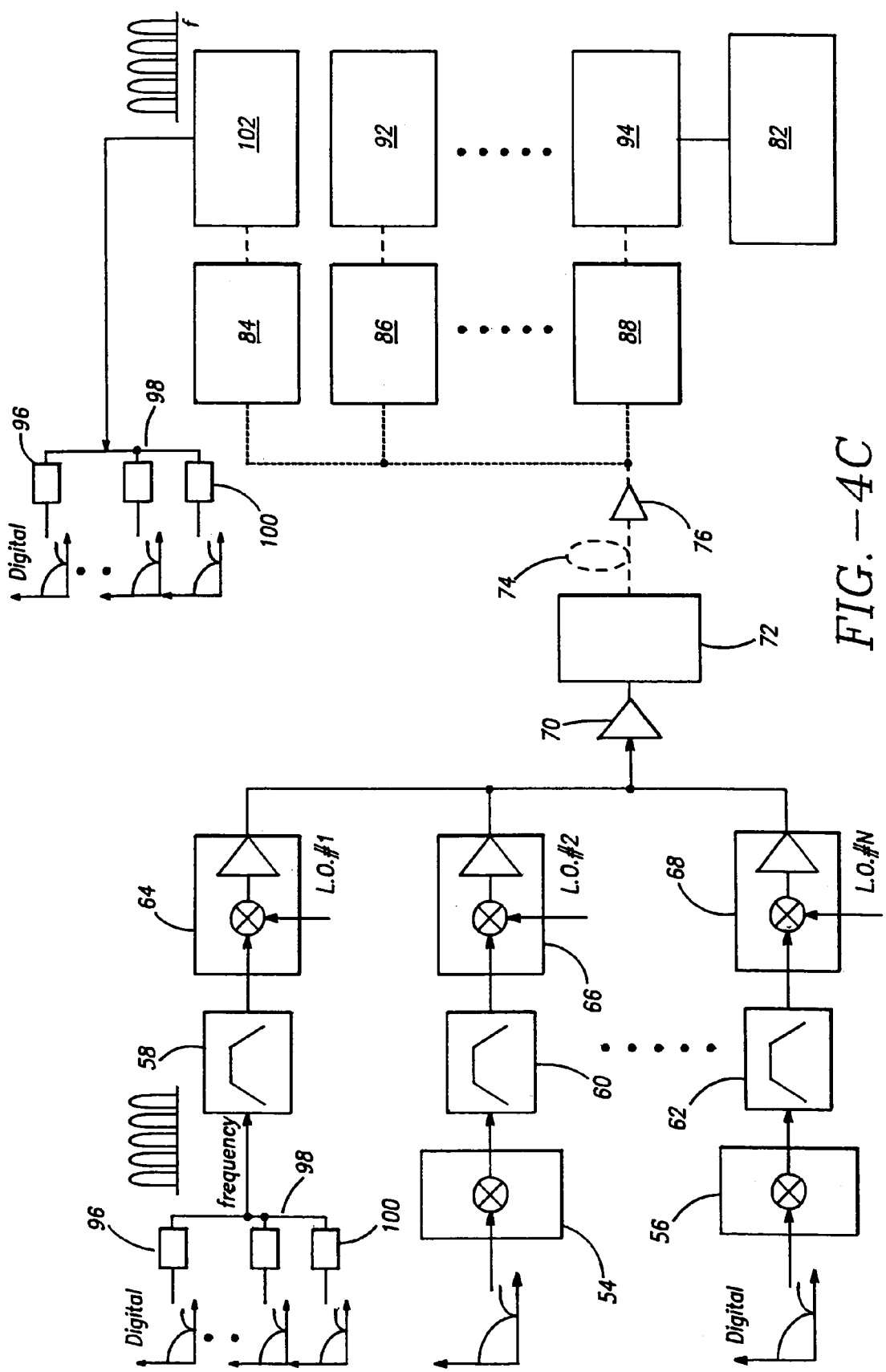
FIG. 4C is a schematic diagram of an optical frequency division multiplexed lightwave system including a broadband optical receiver according to the present invention.

Another alternate arrangement of the transmission system is shown in FIG. 4C. In this embodiment, one of the channels carries a plurality of low bit-rate channels 96, 98, 100. The plurality of low bit-rate subcarrier channels 96, 98, 100 are multiplexed onto a single band having a bandwidth which is preferably of a similar size to each of the high bit-rate channels, though this is not necessary. Other components of the device are similar to those shown in FIGS. 4A and 4B, with the exception of the receivers. For each channel which contains low bit-rate subcarrier channels, the baseband optical receiver 90 is replaced with a broadband optical receiver 102. The broadband optical receiver 102 provides the sub-channel signals to demodulators (not shown) which are then used to extract each of the individual sub-channels.

The plurality of low bit-rate channels shown in FIG. 4C can preferably use spectrally efficient modems (96, 98, 100) such as M-ary quadrature amplitude modulated (QAM) modems, quadrature phase shifted keying (QPSK) modems, orthogonal frequency division multiplexing (OFDM) modems or M-ary vestigial sideband (VSB) modems. One skilled in the art will recognize that other spectrally efficient modems may be employed.

Figure 5A:
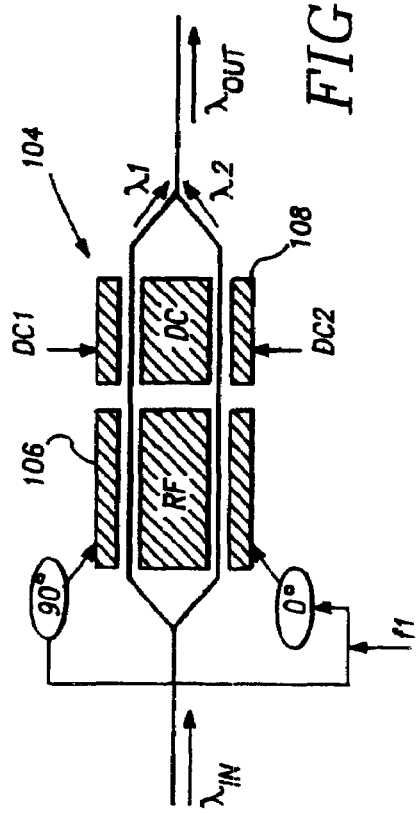
FIG. 5A is a schematic diagram of a prior art dual electrode Mach-Zehnder modulator.

To better understand the present invention, it is useful to discuss OSSB and D-OSSB transmission. In an OSSB system carrying one channel, the channel is modulated onto the optical carrier signal with a modulator shown in detail in FIGS. 5A and 5B. A dual electrode Mach-Zehnder modulator, indicated generally at 104, forms the basis of the system. An incoming light signal $\lambda_{IN}$ is split into a first optical signal $\lambda_1$ and a second optical signal $\lambda_2$. An RF alternating current electrode 106 modulates the two optical signals with the channel signal to be transmitted (i.e. $f_1$), however, $f_1$ is applied to the carrier such that the signal applied to the upper arm of the modulator is phase-shifted 90° with respect to the signal applied to the lower arm. Subsequently, a DC electrode 108 further modulates the carriers such that the two arms are also shifted 90° with respect to each other. That is, the carriers of the two arms are in quadrature with each other. The two signals are then combined to produce an output signal $\lambda_{OUT}$ in which only the carrier and the lower side band are present. This process may be easily modified so that the lower side band is cancelled and the upper side band is transmitted.

Figure 5B:
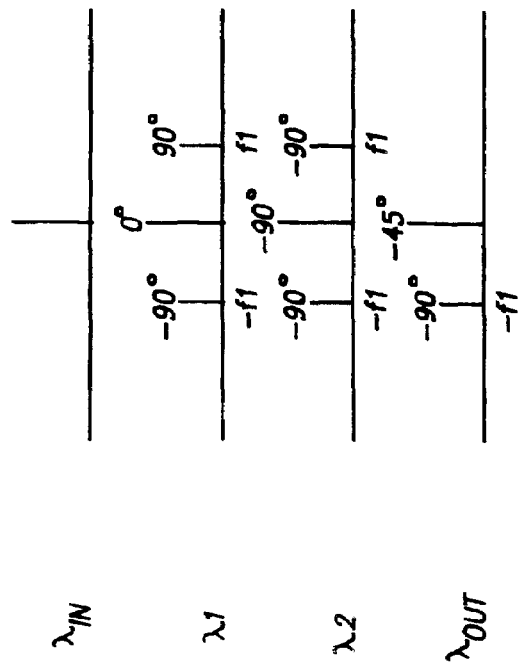
FIG. 5B is a spectral diagram showing input and output of the modulator shown in FIG. 5A.

Referring now to FIG. 5B, spectra of the signals at various stages are shown. Initially, $\lambda_{IN}$ includes only the carrier. After both the AC and DC electrodes 106, 108 have applied an electric field to the carrier signal in the upper arm, $\lambda_1$ has an upper and a lower side band, the upper side band at 90° and the lower side band at −90°, along with the carrier at 0°. Likewise, after passing through both electric fields, the lower arm signal $\lambda_2$ has a carrier at −90°, an upper side band at −90° and a lower side band at −90°. When the two signals $\lambda_1$ and $\lambda_2$ are combined to form $\lambda_{OUT}$ the two upper side bands cancel each other, leaving only the lower side band and the carrier.

Figure 5C:
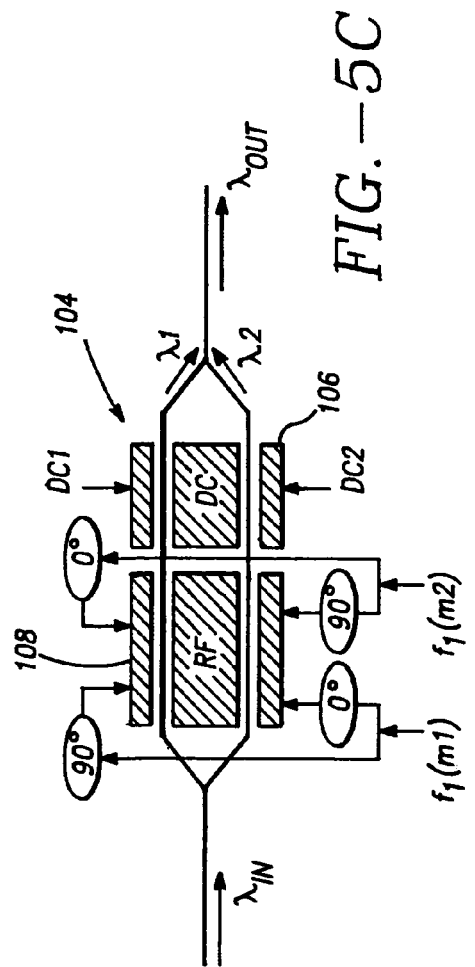
FIG. 5C is a schematic diagram of a dual-electrode Mach-Zehnder modulator as employed in the present invention.
Figure 5D:
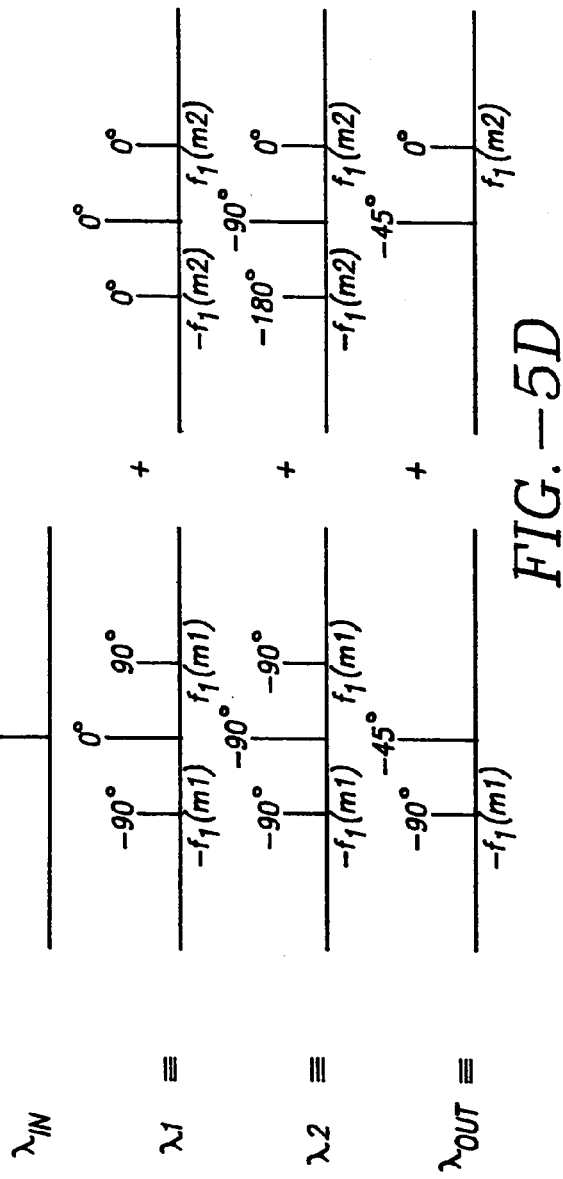
FIG. 5D is a spectral diagram showing input and output of the modulator shown in FIG. 5C.

FIGS. 5C and 5D illustrate D-OSSB transmission. Just as in OSSB, a dual-electrode Mach-Zehnder modulator 104 is used. An incoming light signal $\lambda_{IN}$ is split into a first optical signal $\lambda_1$ and a second optical signal $\lambda_2$. An RF alternating current electrode 106 is used to modulate the two optical signals with a first channel m1, to be transmitted, however, the signal is applied to the carrier in such a way that the m1 component of the first and second optical signals are phase-shifted 90° with respect to each other. At the same time, the RF alternating current modulates the two optical signals with a second signal m2, with the m2 component of the first and second optical signals phase-shifted 90° with respect to each other. Moreover, in each arm of the modulator, m1 is phase-shifted 90° with respect to m2. Subsequently, a DC electrode 209 further adjusts the phases of the carriers such that the two arms are also shifted 90° with respect to each other, that is the carriers of the two arms are in quadrature with each other. The two signals are then combined to produce an output signal $\lambda_{OUT}$ in which contains the carrier, m2 as the upper side band and m1 as the lower side band.

As shown in FIG. 5D, $\lambda_{IN}$ includes only the carrier. After both the AC and DC electrodes have applied an electric field to the carrier signal in the upper arm, $\lambda_1$ can be represented by the sum of the two spectra shown. A first spectrum of $\lambda_1$ has an upper and a lower side band each carrying m1, the upper side band at 90° and the lower side band at −90°, along with the carrier at 0°. A second, carrying m2, has an upper side band at 0° and a lower side band also at 0°. Likewise, after passing through both electric fields, the lower arm signal $\lambda_2$ can be represented by the sum of two spectra. A first $\lambda_2$ spectrum carrying m1 has a carrier at −90°, an upper side band at −90° and a lower side band at −90°. A second, carrying m2, has a carrier at −90°, an upper side band at 0° and a lower side band at 180°. When the two signals $\lambda_1$ and $\lambda_2$ are combined to form $\lambda_{OUT}$ the two upper side bands of m1 cancel each other, leaving only the lower side band and the carrier. Similarly, the two lower m2 sidebands cancel each other, leaving only the upper side band and the carrier. Thus, $\lambda_{OUT}$ contains the carrier and the two side bands, the lower carrying m1 and the upper carrying m2. The system can be easily modified to reverse the order such that the lower side band will carry m2 and the upper will carry m1.

As discussed above, ODSB transmission has the drawback that an optical filter will have a spectrum 109 which tends to overlap multiple channels, introducing noise into the decoded signal, as shown in FIG. 3A. Further, ODSB requires allocating one-half of the bandwidth to images of the primary information since each side band carries the same information. As shown in FIG. 3B, the OSSB technique shown in FIGS. 5A–B fail to completely solve these problems. Though the lower side band is available for additional channels as in D-OSSB, the problem with the filter overlap remains, and a second problem is introduced. Since it is difficult to produce perfect quadrature in the multiplexer, cancellation of the unwanted side band will often be incomplete, resulting in residual images 110. These residual images 110 produce additional noise, which when added to the noise resulting from the filter's slow roll off, can seriously interfere with reception of the transmitted data.

As shown in FIG. 3C, by interleaving channels with empty channels, the problem of slow band bass filter roll off can be eliminated and the problem of residual images can be substantially reduced. Since no channel is directly adjacent to another, the filter can properly capture a single channel without also picking up portions of the neighboring ones. Since there are only two residual images 110 on each side band (in this example using four channels), the filter will pick up a smaller amount of noise from the images. Note how in FIG. 3C, only tails of each residual image are within the filter range 109. In contrast, in FIG. 3B, nearly two entire residual images are within the filter range 109. Even more importantly, the system penalty due to optical nonlinearity-induced four-wave mixing can also be minimized using this technique.

A modulator consistent with the present invention for interleaving channels to produce I-OSSB modulation is illustrated in FIGS. 6A–E. An input optical signal $\lambda_{IN}$, includes only the carrier as shown in FIG. 6B. The AC electrode 106 of a Mach-Zehnder multiplexer 104 applies an electric field to the carrier signal in the upper arm, $\lambda_1$ containing the channels to be transmitted. After further application of a DC field by the DC electrode 108, the output can be represented by the spectrum shown in FIG. 6C. Four separate signals $f_1$, $f_2$, $f_3$, and $f_4$ are multiplexed onto the carrier, each producing both an upper side band and a lower side band. Adjacent channels are 90° out of phase with each other.

Similarly, the lower arm has four separate signals $f_1$, $f_2$, $f_3$, and $f_4$ multiplexed onto the carrier, as shown in FIG. 6D. Each of the signals, $f_1$, $f_2$, $f_3$, and $f_4$, is applied to the lower arm in quadrature with the corresponding signal $f_1$, $f_2$, $f_3$, and $f_4$ in the upper arm and each is 90° out of phase with its adjacent channel. Each arm is then placed in quadrature with the other by the DC electrode 108.

When the two signals $\lambda_1$ and $\lambda_2$ are combined to form $\lambda_{OUT}$ the $f_1$ and $f_3$ signals are cancelled in the upper side band, leaving only $f_2$ and $f_4$. Likewise, in the lower side band, $f_2$ and $f_4$ signals are cancelled leaving only $f_1$ and $f_3$. Thus, $\lambda_{OUT}$ contains the carrier and the two side bands, the lower side band carrying $f_1$ and $f_3$ and the upper side band carrying $f_2$ and $f_4$. The system can be easily modified to reverse the order such that the lower side band will carry $f_2$ and $f_4$ and the upper will carry $f_1$ and $f_3$. As can be appreciated from the spectrum shown in FIG. 6E, this result corresponds to the spectrum shown in FIG. 3C and each channel has no directly adjacent channels, that is, every other channel has been cancelled.

Figure 7:
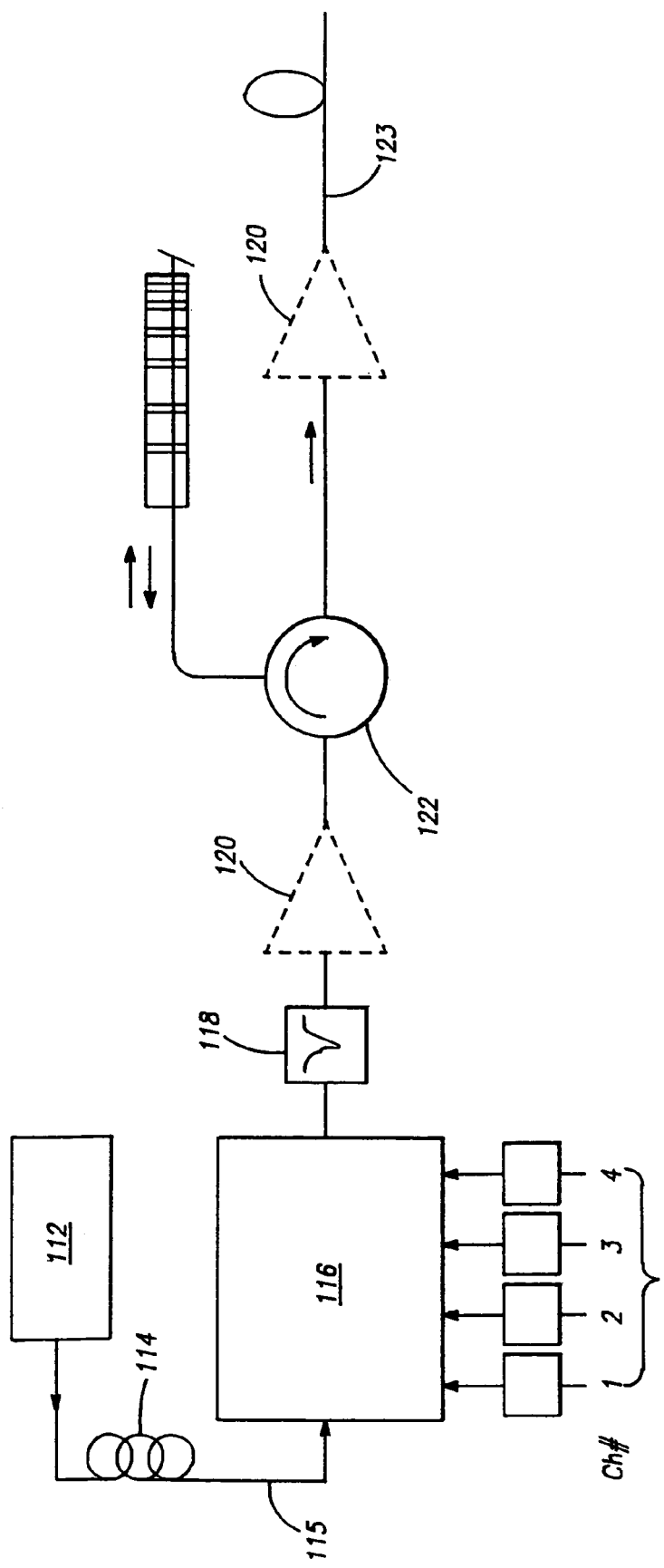
FIG. 7 is a schematic diagram showing an interleaved optical single sideband suppressed carrier optical transmitter according to the present invention.

The I-OSSB modulator of FIGS. 6A–E may be used in a transmission system as illustrated in FIG. 7. A continuous wave light source 112, such as a laser diode, produces a light signal. The light signal passes through a polarization controller 114 or a polarization maintaining optical fiber 115 which maintains a particular polarization of the light. The light signal is processed by an I-OSSB optical modulator 116 as described above, producing, in the example as shown, four multiplexed channels. A local or remote notch filter 118 is disposed downstream from the modulator 116. The notch filter 118 is a bandreject filter which is selected to eliminate the carrier without interfering with the signals of the channels. Optionally, an EDFA amplifier 120 may follow the notch filter 118 to boost the signal strength. When the transmission distance of a system is extremely long, the system could include a dispersion compensating device 122 which helps to reduce the signal loss and distortion due to dispersion and intermodulation (i.e. four wave mixing). This dispersion compensating device 122 may be, for example, a chirped fiber Bragg grating (CFBG), as shown in the Figure, in which the period of the grating varies linearly with position. As a result, the grating reflects different wavelengths at different points along its length which produces a wavelength dependent delay in the signal. In a wide band application, it may be necessary to employ multiple CFBGs in order to produce sufficient delay across a broad frequency range. Alternately, a dispersion compensating fiber may be used, however, dispersion compensating fibers generally have the drawback that attenuation is very high. After passing through the dispersion compensating component 122, the signal may be amplified again by an amplifier 120, then it is transmitted through the optical fiber 123, which is preferably a single mode fiber. It should be noted that all these dispersion compensation devices may not be needed when the transmission distance is not long enough to generate significant dispersion penalties.

Figure 8:
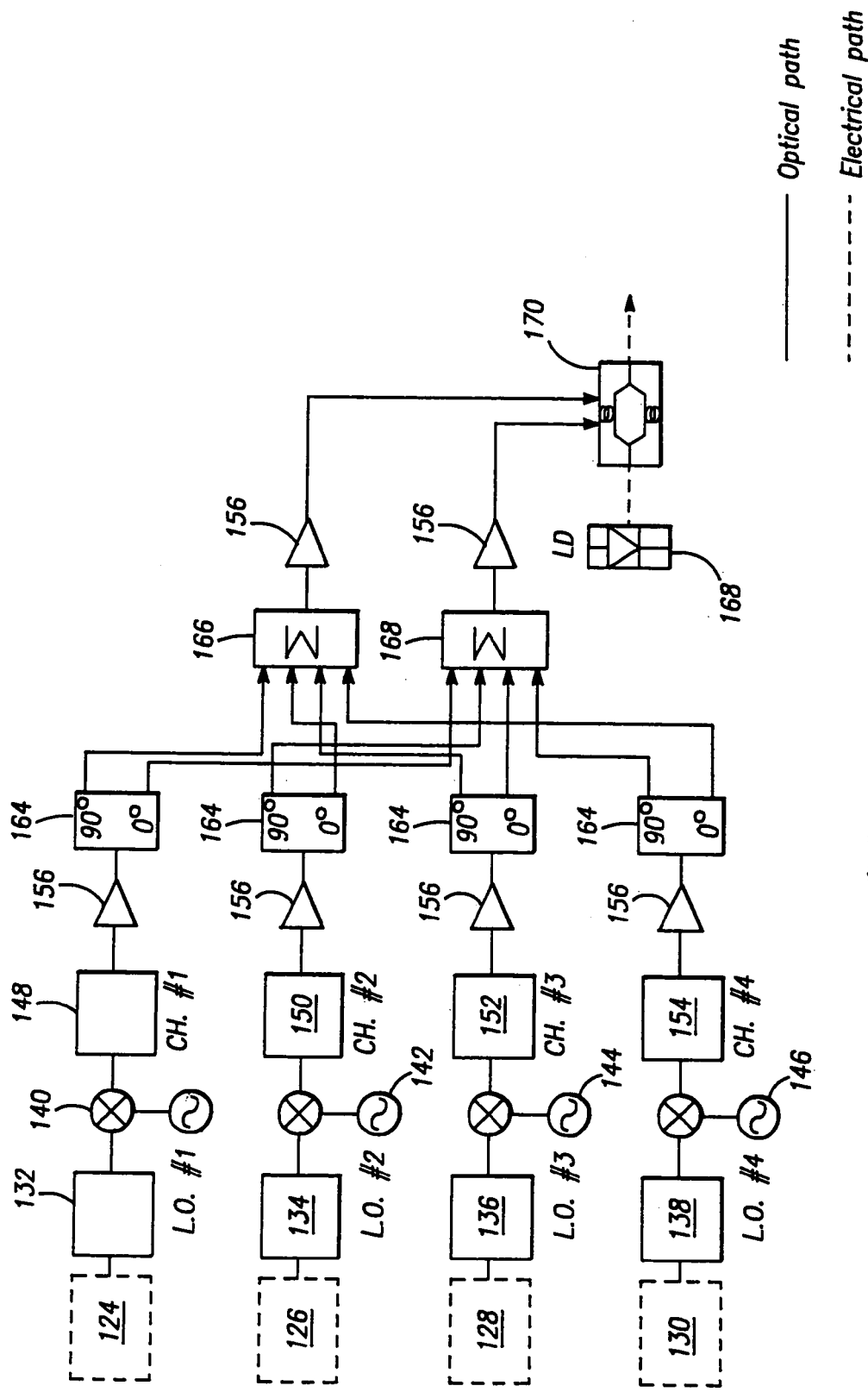
FIG. 8 is a schematic diagram of a transmitter according to the present invention.
Figure 12:
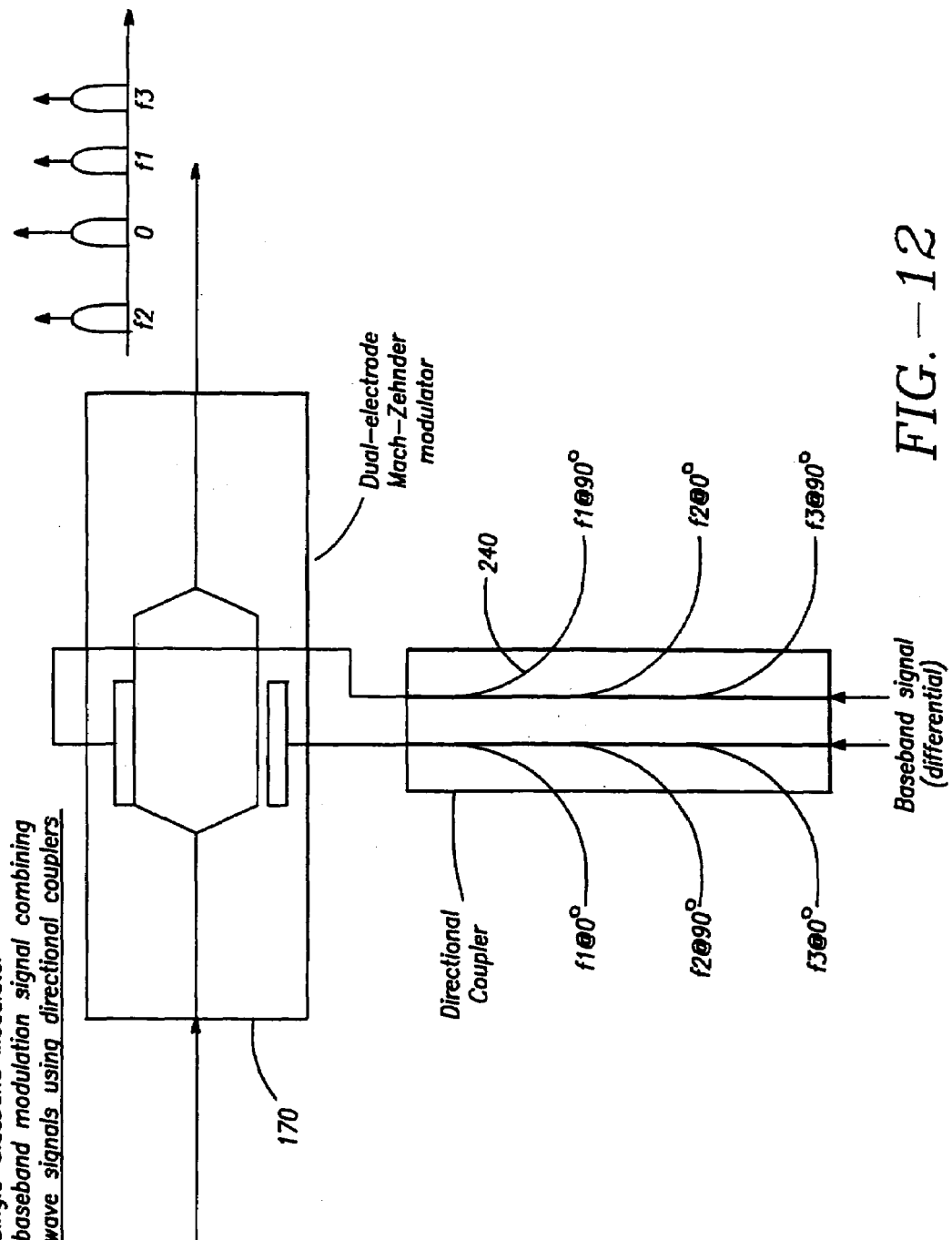
FIG. 12 is a schematic diagram illustrating how cascaded directional couplers can be used to combine multiple 0°/90° microwave modulation signals with a baseband modulation signal.

FIG. 8 shows additional detail of the electrical portion of a transmitter according to the present invention. A plurality of baseband encoders, for purposes of illustration, four, 124, 126, 128, 130 produce a signal for each of a plurality of channels. Each channel signal is preferably filtered with a low pass filter 132, 134, 136, 138 prior to upconversion by a local oscillator 140, 142, 144, 146. Next, the signals are preferably filtered again with a band pass filter 148, 150, 152, 154 prior to optional amplification by an amplifier 156. A hybrid coupler 164 is used to split each channel into two signals at 90° to each other. Two of the 90° signals are passed to a first summer 166 and two to a second summer 168. Likewise, two of the 0° are passed to each summer 166, 168. By way of example, the 90° of channels 1 and 3 are passed along with the 0° of channels 2 and 4 to the first summer 166, while the 90° of channels 2 and 4 are passed along with the 0° of channels 1 and 3 to the second summer 168. The summed signals may then be used to modulate a light signal from light emitting device 168 at the carrier frequency in a dual-arm Mach-Zehnder modulator 170 as shown in FIGS. 6A–E. Summers 166 and 168 may also be replaced by wideband microwave/millimeter wave directional couplers, as illustrated in FIG. 12, to increase the number of combined channels and add an additional baseband signal.

Figure 9:
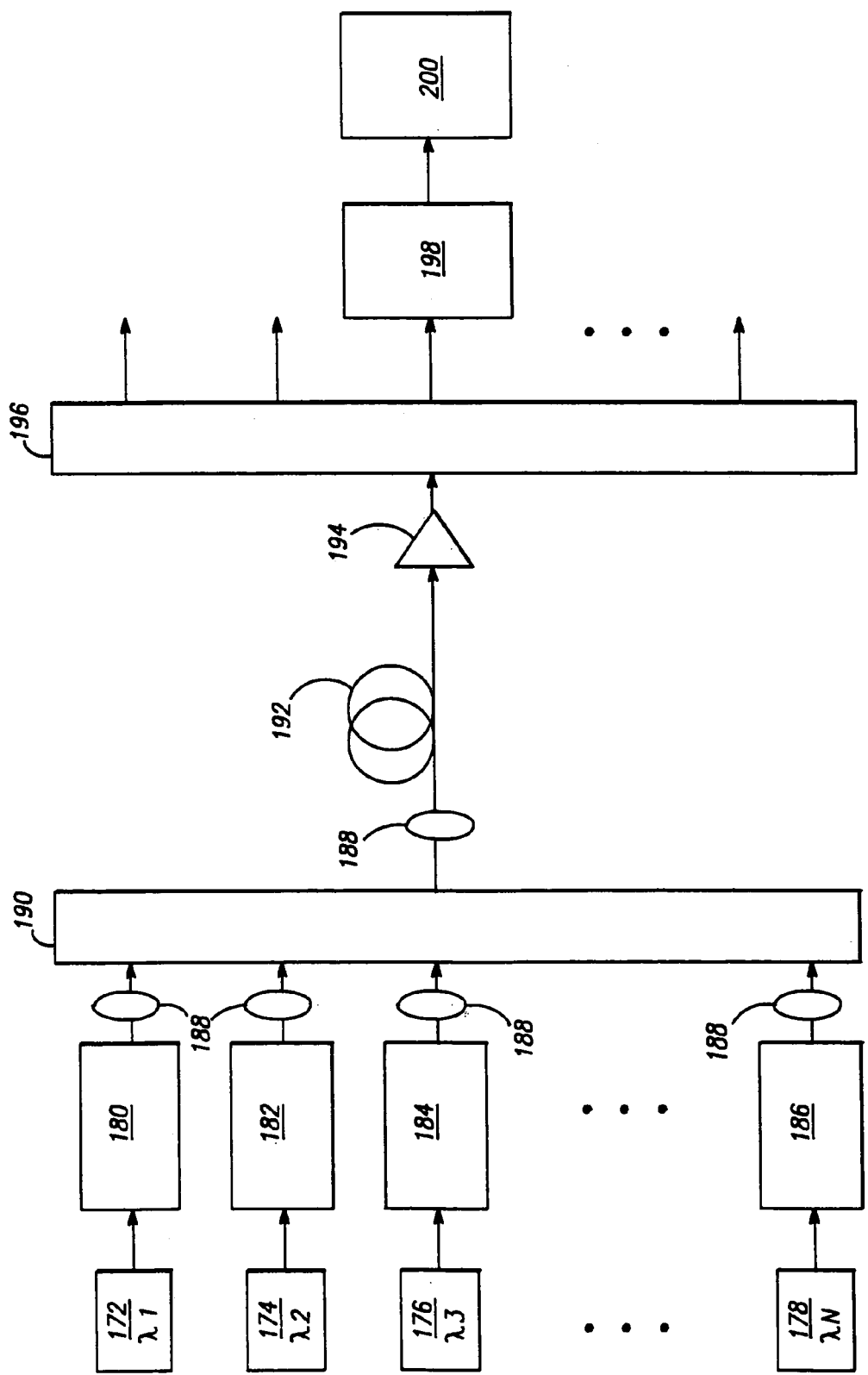
FIG. 9 is a schematic diagram of a multiple light source optical communication system according to the present invention.

It may be useful in practice to provide a system according to the present invention which combines the I-OSSB modulator with dense wavelength division multiplexing to provide extremely high bandwidth transmission, as shown in FIG. 9. A plurality of light emitting devices 172, 174, 176, 178 supply carrier signals for a plurality of I-OSSB modulators 180, 182, 184, 186, each transmitting multiple channels. The multiplexed signals are preferably passed through a dispersion compensating device 188 before or preferably after entering a multiplexer 190, which may be of conventional design.

Multiplexer 190 can also be replaced by a wideband optical coupler whenever applicable. The multiplexed signal is transmitted over a single mode fiber 192 and treated, as appropriate, with an amplifier 194 such as an EDFA. A demultiplexer 196, which may be of conventional design, separates the carrier signals, which are then filtered by an optical filter 198 and received with a receiver 200 according to the present invention, such as is shown in FIG. 4B or 4C. In place of a conventional demultiplexer 196, the demultiplexer 196 may be custom designed to accommodate various wavelength windows.

Figure 10:
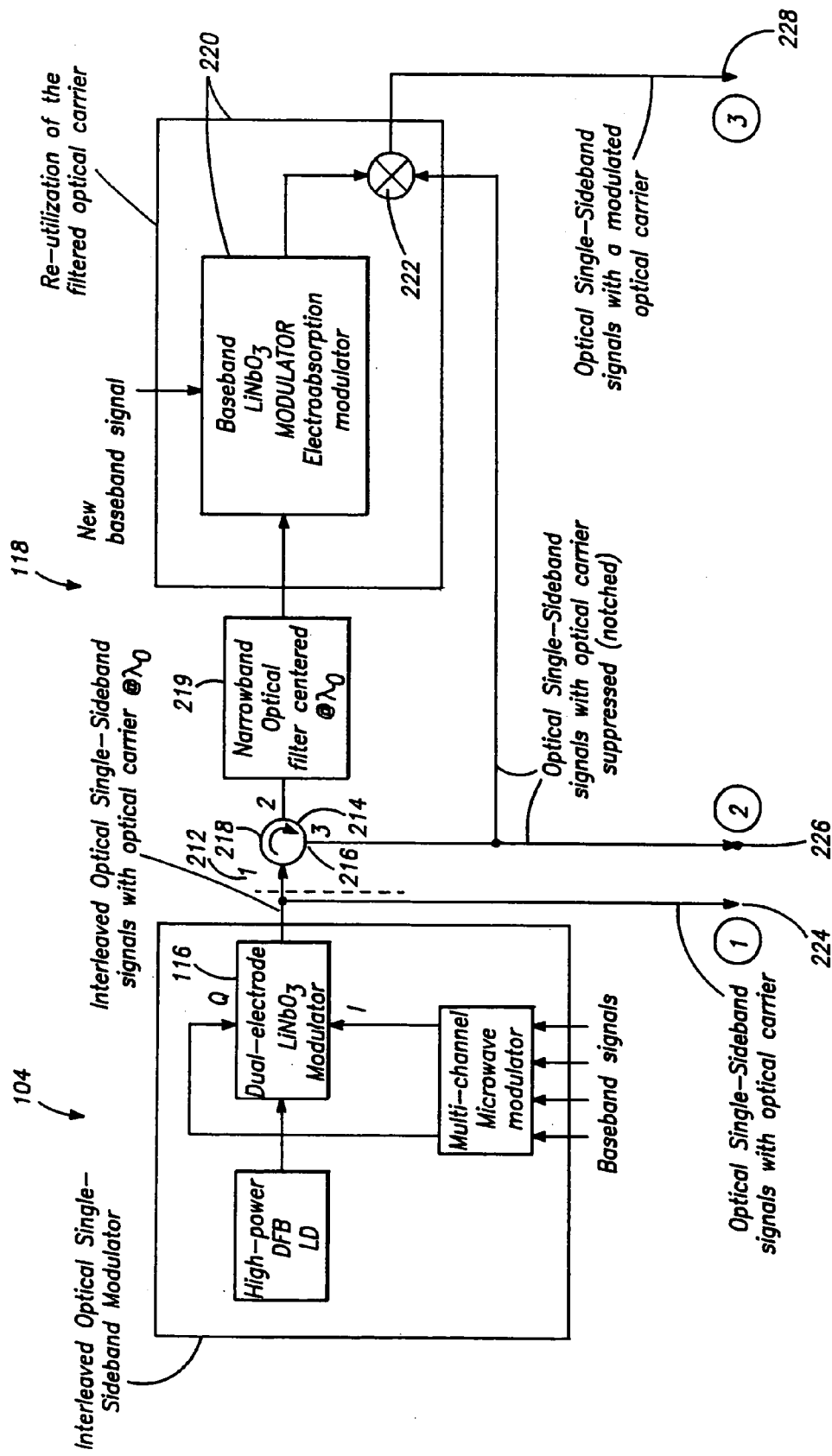
FIG. 10 is a schematic diagram of one embodiment of a notch filter, and the re-modulation of an optical carrier, of the present invention.

Referring now to FIG. 10, one embodiment of notch filter 118 is illustrated. In this embodiment notch filter 118 is coupled to dual electrode Mach-Zehnder modulator 104. An optical coupler 210 includes at least first, second and third ports 212, 214, and 216, respectively. In one embodiment optical coupler 210 is a circulator. An optical bandpass filter 218 is coupled to second port 214. Preferably, optical bandpass filter 218 is a narrowband filter (e.g., based on fiber gratings or Fabry-Perot cavity) that is centered at the wavelength of the carrier signal. Optical bandpass filter 218 separates the output into a transmitted signal and a reflected signal. The transmitted signal contains the optical carrier. The reflected signal includes the interleaved optical single sideband signals that are reflected from optical bandpass filter 218 to third port 216. An external modulator 220, which can be but is not limited to a Mach Zehnder, is coupled to optical bandpass filter 218. A baseband signal is applied to the external modulator 220 to modulate the optical carrier and create a modulated optical carrier.

Notch filter 118 can be positioned adjacent to Mach-Zehnder modulator 104 or at a remote location in an optical network.

The optical carrier transmitted through optical bandpass filter can be re-utilized with an additional baseband signal that modulates the optical carrier via the baseband external modulator.

A coupler 222 can be coupled to third port 216 and external modulator 220, the coupler combining the modulated optical carrier with the interleaved optical single sideband signals.

The optical signal at point 224 includes the interleaved optical single sideband signals and the original optical carrier. At point 226, the optical signal includes only the interleaved optical single sideband signals. At point 228, the output signal includes the interleaved optical single sideband signals and the modulated optical carrier.

After the output 226 is launched into an optical network, an optical carrier can be re-inserted in a remote network when there is a need for broadband detection, as illustrated in FIG. 1. The broadband detection with simple incoherent microwave demodulators could eliminate narrowband optical filters in FIG. 11 and consequently save significant cost.

Figure 11:
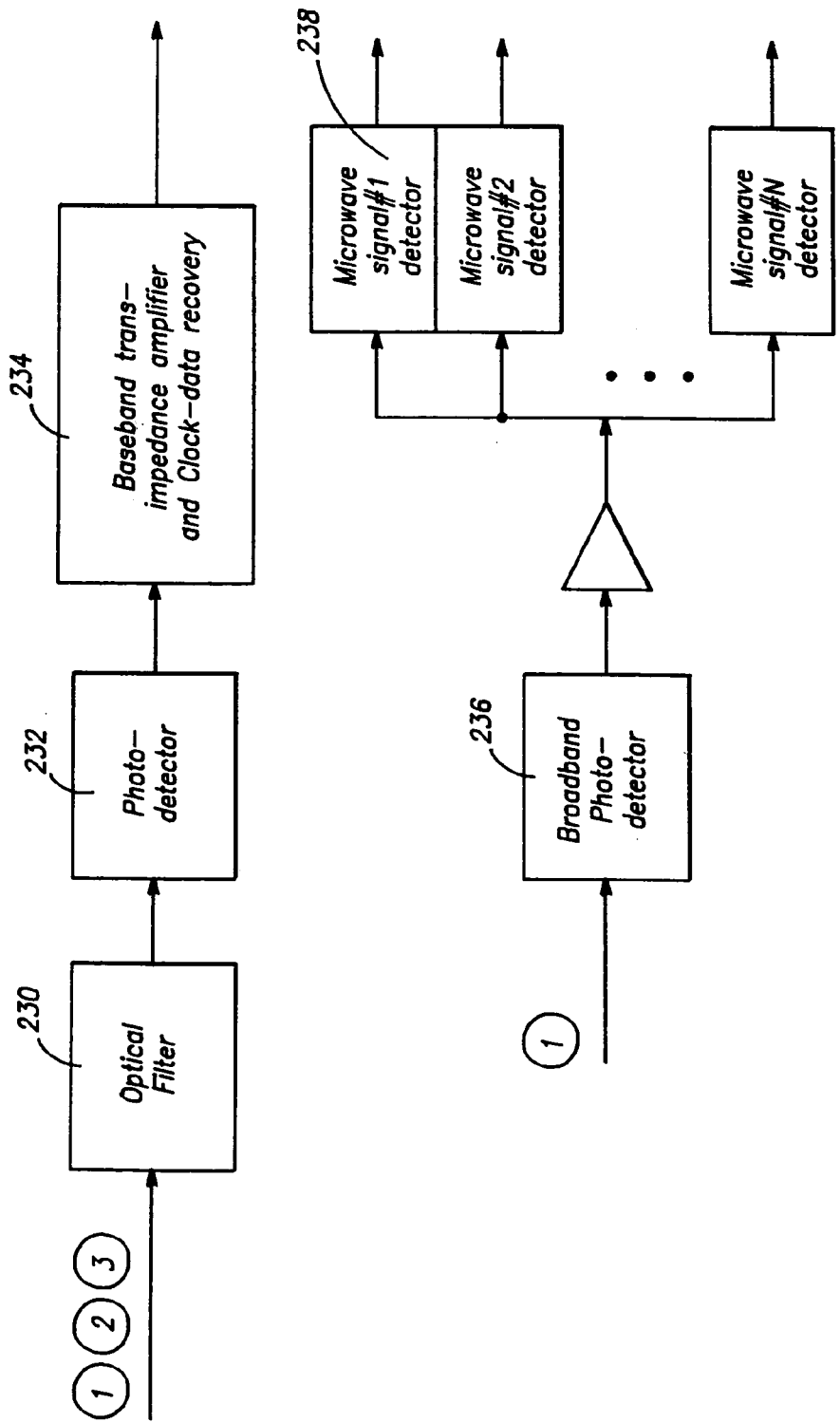
FIG. 11 is a schematic diagram of detection methods useful with the FIG. 10 transmitter.

In FIG. 11, the optical signals at points 224, 226 and 228 can be detected by an optical filter 230 coupled to a photo-detector 232 and a baseband trans-impedance amplifier 234. This is basically the same type of baseband receiver as conventional on-off keyed non-return-to-zero (NRZ) signals. The optical signal from point 224 can be detected with a broadband photo-detector 236 in combination with individual microwave channel detectors 238 which could be coherent or incoherent detection. In this case, the transmitter and receiver arrangement are very similar to conventional subcarrier multiplexed lightwave system, except that the transmitter now is an optical single sideband modulator rather than an optical double sideband modulator.

Referring now to FIG. 12, cascaded directional couplers 240 are coupled to Mach-Zehnder modulator 170 and replace summers 166 and 168.

Using cascaded directional couplers to replace summers to couple in signal power channel by channel can provide a better isolation between channels, and in the same time they are more scaleable than summers and provides the option of adding an additional baseband channel.

While the invention has been described in connection with what is presently considered to be the most practical and preferred embodiment, it is to be understood that the invention is not limited to the disclosed embodiment, but on the contrary it is intended to cover various modifications and equivalent arrangement included within the spirit and scope of the claims which follow.

What is claimed is what is described and illustrated, including:

1. An optical communication device, comprising:
   an electrical modulation control unit to produce a first modulation control signal comprising a plurality of first channel signals and a second modulation control signal comprising a plurality of second channel signals that are respectively at the different channel frequencies of the first channel signals and respectively carry the same channel information as the first channel signals, wherein two adjacent channel signals in each of the first and the second modulation control signals have a relative phase shift of 90 degrees, and wherein each channel signal in the first modulation control signal has a relative phase shift of 90 degrees with respect to a corresponding channel signal at the same channel frequency in the second modulation control signal; and
   a Mach-Zehnder optical modulator comprising an input port to receive an optical carrier at an optical carrier frequency, a first optical path and a second optical path which receive a first portion of the optical carrier an a first optical carrier and a second portion of the optical carrier as a second optical carrier, respectively, and an output port to combine light from the first and second optical paths to produce an optical output signal which carries output channel signals having the same channel information of the first and second channel signals and a frequency spacing between two adjacent output channel signals being twice a frequency spacing between two adjacent channel signals in the first and second modulation control signals,
   wherein the first optical path receives and responds to the first modulation control signal to modulate the first optical carrier to carry the first channel signals on both sides of the optical carrier frequency, and the second optical path receives and responds to the second modulation control signal to modulate the second optical carrier to carry the second channel signals on both sides of the optical carrier frequency and to produce a phase shift of 90 degrees in light in the second optical path relative to light in the first optical path.

2. The device as in claim 1, wherein the Mach-Zehnder optical modulator comprises a first electrode along the first optical path to receive the first modulation control signal and a second electrode along the second optical path to receive the second modulation control signal.

3. The device as in claim 2, wherein the Mach-Zehnder optical modulator further comprises a first DC electrode along the first optical path to bias the first optical path and a second DC electrode along the second optical path to bias the first optical path to produce the phase shift of 90 degrees in light in the second optical path relative to light in the first optical path.

4. The device as in claim 1, wherein the electrical modulation control unit comprises:
   a plurality of electrical signal paths respectively corresponding to a number of channel signals in each of the first and second channel signals to produce a plurality of signal channels at the different channel frequencies, respectively, wherein each electrical signal path comprises a signal mixer to mix a data channel with a local oscillator signal at one of the different channel frequencies to produce a channel signal, and means for splitting the channel signal into a first channel signal and a second channel signal that is phase shifted by 90 degrees relative to the first channel signal;
   first summing means for combining first channel signals from the plurality of electrical signal paths to produce the first modulation control signal; and
   second summing means for combining second channel signals from the plurality of electrical signal paths to produce the second modulation control signal.

5. The device as in claim 4, wherein each electrical signal path comprises a low pass signal filter to filter the data channel prior to entry to the signal mixer and a bandpass filter coupled between the mixer and the splitting means to filter the channel signal.

6. An optical communication device, comprising:
   an electrical modulation control unit to produce a first modulation control signal comprising a plurality of first channel signals and a second modulation control signal comprising a plurality of second channel signals that are respectively at the different channel frequencies of the first channel signals and respectively carry the same channel information as the first channel signals, wherein two adjacent channel signals in each of the first and the second modulation control signals have a relative phase shift of 90 degrees, and wherein each channel signal in the first modulation control signal has a relative phase shift of 90 degrees with respect to a corresponding channel signal at the same channel frequency in the second modulation control signal; and
   a Mach-Zehnder optical modulator comprising an input port to receive an optical carrier at an optical carrier frequency, a first optical path and a second optical path which receive a first portion of the optical carrier as a first optical carrier and a second portion of the optical carrier as a second optical carrier, respectively, and an output port to combine light from the first and second optical paths to produce an optical output signal which carries output channel signals having the same channel information of the first and second channel signals,
   wherein the first optical path is configured to receive and respond to the first modulation control signal to modulate the first optical carrier to carry the first channel signals on both sides of the optical carrier frequency, and the second optical path is configured to receive and respond to the second modulation control signal to modulate the second optical carrier to carry the second channel signals on both sides of the optical carrier frequency and to produce a phase shift of 90 degrees in light in the second optical path relative to light in the first optical path.

7. The device as in claim 6, wherein the Mach-Zehnder optical modulator comprises a first electrode along the first optical path to receive the first modulation control signal and a second electrode along the second optical path to receive the second modulation control signal.

8. The device as in claim 7, wherein the Mach-Zehnder optical modulator further comprises a first DC electrode along the first optical path to bias the first optical path and a second DC electrode along the second optical path to bias the first optical path to produce the phase shift of 90 degrees in light in the second optical path relative to light in the first optical path.

9. The device as in claim 6, wherein the electrical modulation control unit comprises:
a plurality of electrical signal paths respectively corresponding to a number of channel signals in each of the first and second channel signals to produce a plurality of signal channels at the different channel frequencies, respectively, wherein each electrical signal path comprises a signal mixer to mix a data channel with a local oscillator signal at one of the different channel frequencies to produce a channel signal, and means for splitting the channel signal into a first channel signal and a second channel signal that is phase shifted by 90 degrees relative to the first channel signal;
first summing means for combining first channel signals from the plurality of electrical signal paths to produce the first modulation control signal; and
second summing means for combining second channel signals from the plurality of electrical signal paths to produce the second modulation control signal.

10. The device as in claim 9, wherein each electrical signal path comprises a low pass signal filter to filter the data channel prior to entry to the signal mixer and a bandpass filter coupled between the miser and the splitting means to filter the channel signal.

11. A method for modulating a plurality of channels at different channel frequencies onto an optical carrier at an optical carrier frequency, comprising:
electronically producing a first modulation control signal which comprises a plurality of first channel signals at different channel frequencies and a second modulation control signal which comprises a plurality of second channel signals that are respectively at the different channel frequencies of the first channel signals and respectively carry the same channel information as the first channel signals, wherein two adjacent channel signals in each of the first and the second modulation control signals have a relative phase shift of 90 degrees, and wherein each channel signal in the first modulation control signal has a relative phase shift of 90 degrees with respect to a corresponding channel signal at the same channel frequency in the second modulation control signal;
applying the first modulation control signal to a first optical path of a Mach-Zehnder optical modulator to module a first portion of the optical carrier in the first optical path to carry the first channel signals on both sides of the optical carrier frequency;
applying the second modulation control signal to a second optical path of the Mach-Zehnder optical modulator to module a second portion of the optical carrier in the second optical path to carry the second channel signals on both sides of the optical carrier frequency;
biasing a relative phase between the first and the second optical path to produce a phase shift of 90 degrees in light in the second optical path relative to light in the first optical path; and
combining light from the first and second optical paths to produce an optical output signal which carries the first channel signals.

12. The method as in claim 11, wherein the electronically producing comprises:
mixing a data channel with a local oscillator signal to produce a channel signal for each channel,
splitting the channel signal into a first channel signal and a second channel signal that is phase shifted by 90 degrees relative to the first channel signal;
combining first channel signals to produce the first modulation control signal; and
combining second channel signals to produce the second modulation control signal.

13. The method as in claim 12, further comprising;
using a first set of cascaded directional couplers to respectively receive first channel signals to achieve the combining of the first channel signals; and
using a second set of cascaded directional couplers to respectively receive second channel signals to achieve the combining of the second channel signals.

* * * * *